United States Patent [19]

Richardson et al.

[11] Patent Number: 4,465,156

[45] Date of Patent: Aug. 14, 1984

[54] MOTORCYCLE SUSPENSION SYSTEM

[76] Inventors: Robert H. Richardson; Wayne Richardson, both of 862 N. Pleasant St., Southington, Conn. 06489

[21] Appl. No.: 378,845

[22] Filed: May 17, 1982

[51] Int. Cl.³ .............................................. B62K 25/26
[52] U.S. Cl. .................................... 180/227; 280/284; 267/57
[58] Field of Search ................ 180/227; 280/284, 285, 280/283, 721; 267/57

[56] References Cited

U.S. PATENT DOCUMENTS

| | | | |
|---|---|---|---|
| 2,669,463 | 2/1954 | Torre | 267/57 |
| 2,855,212 | 10/1958 | Houser | 280/721 |
| 2,955,840 | 10/1960 | Drechsel | 267/57 |
| 4,033,605 | 7/1977 | Smith et al. | 267/57 |
| 4,139,072 | 2/1979 | Dawson | 180/227 |
| 4,378,857 | 4/1983 | Andersson | 180/227 |

Primary Examiner—John A. Pekar

[57] ABSTRACT

An improved motorcycle suspension system comprising a substantially straight torsion bar having a first end and a second end; a rear wheel axle support attached rotatably and pivotally to the motorcycle frame; means for holding the first end of the torsion bar fixed to prevent rotation thereof; a multiplying linkage for reversibly converting a substantially vertical motion of the rear wheel axle support caused by irregularities in the surface over which the motorcycle is ridden into a torque applied to the second end of the torsion bar causing the torsion bar to provide a progressively larger opposing torque in reaction to the applied torque and requiring progressively more force to apply an equivalent torque to the torsion bar for progressively larger upward misplacements thus damping the motions of the rear wheel axle support. A tension winder is attached to the torsion bar adjacent to the first end of the torsion bar to provide a means for adjustably twisting the torsion bar controlling thereby the damping of the motions of the rear wheel axle support.

7 Claims, 5 Drawing Figures

MOTORCYCLE SUSPENSION SYSTEM

THE FIELD OF THE INVENTION

This invention relates to improved motorcycle suspension systems, in particular to more reliable suspension systems that can provide a smoother quality ride on a wider variety of surfaces.

BACKGROUND OF THE INVENTION

The typical rear wheel motorcycle suspension system of the prior art includes a rear wheel axle support which comprises two nearly equal metal swing arms held in nearly horizontal side-by-side relation; each of the swing arms being attached pivotally at their front ends to the motorcycle frame and at their rear ends to the motorcycle wheel axle so that the rear axle can move up and down in response to bumps. For further guidance and support the swing arms may be connected to one another by a bar or plate positioned near their center. The prior art motorcycle suspension systems further comprise either one or two shock absorbers surrounded exteriorly by a spring; the shock absorber and the spring being attached between the frame and the swing arms so as to damp upward motions of the swing arms caused by bumps thus controlling the rebound of the system.

These prior art suspension systems have several disadvantages. First, a spring will rebound past the initial displacement it experiences for large bumps thus amplifying the bump. Second, a coil spring will fatigue, eventually requiring that the suspension systems be disassembled and that the spring be replaced. Third, the springs and shock absorbers of the prior art are comparatively heavy and bulky adding weight to the motorcycle and making the suspension system more vulnerable to damage in an accident. Finally, it is almost impossible to achieve a continuous adjustment of the stiffness of the prior art suspension systems without disassembly.

Torsion bars are included in prior art suspension systems, but primarily in automobile suspension systems where they are connected directly to the control arms which hold the wheel spindel. Such systems are lightweight and do eliminate some of the above disadvantages but have difficulties in providing a rapid, smooth response to large displacements. The improved suspension system of this invention provides a better quality of ride despite large displacements.

It is an object of this invention to provide an improved suspension system for damping motions of the rear axle of the motorcycle which provides a progressively larger resistance to displacement as the size of the displacement increases without an unduly complicated mechanism, thus providing a smoother ride over a wider variety of surfaces.

It is another object of this invention to provide a progressively stiffer, but rapidly responsive, suspension system for a motorcycle which is ligher-in-weight and more compact than those of the prior art.

It is also an object of this invention to provide a suspension system for providing a gradually increasing resistance to increasing displacements of the motorcycle wheel which is more rapidly responsive to both large and small bumps than those of the prior art.

It is a further object of this invention to provide a simpler suspension system for providing a progressively stiffer ride which is continuously adjustable without requiring disassembly.

SUMMARY OF THE INVENTION

An improved motorcycle suspension system comprising a substantially straight torsion bar having a first end and a second end; a rear wheel axle support attached pivotally to the motorcycle frame; means for holding the first end of the torsion bar fixed to prevent rotation thereof; a multiplying linkage for converting the substantially vertical motions of the rear wheel axle support caused by irregularities in the surface over which the motorcycle is ridden into a torque applied to the second end of the torsion bar causing the torsion bar to provide a progressively increasing opposing torque in reaction to the applied torque and requiring progressively more force to apply an equivalent torque to said torsion bar for progressively larger upward displacements, thus damping the motions of the rear wheel axle support.

Increasing displacement of the rear axle support causes a progressively increasing opposing torque to be produced in the torsion bar resulting in damping without an overshoot and thus a smoother ride. A tension winder is attached to the torsion bar to provide a means for adjustably twisting the torsion bar controlling thereby the damping of the motions of the rear axle support.

BRIEF DESCRIPTION OF THE DRAWINGS

The features and operation of this invention will now be made more apparent by reference to the following drawings.

DETAILED DESCRIPTION

Figure 1:
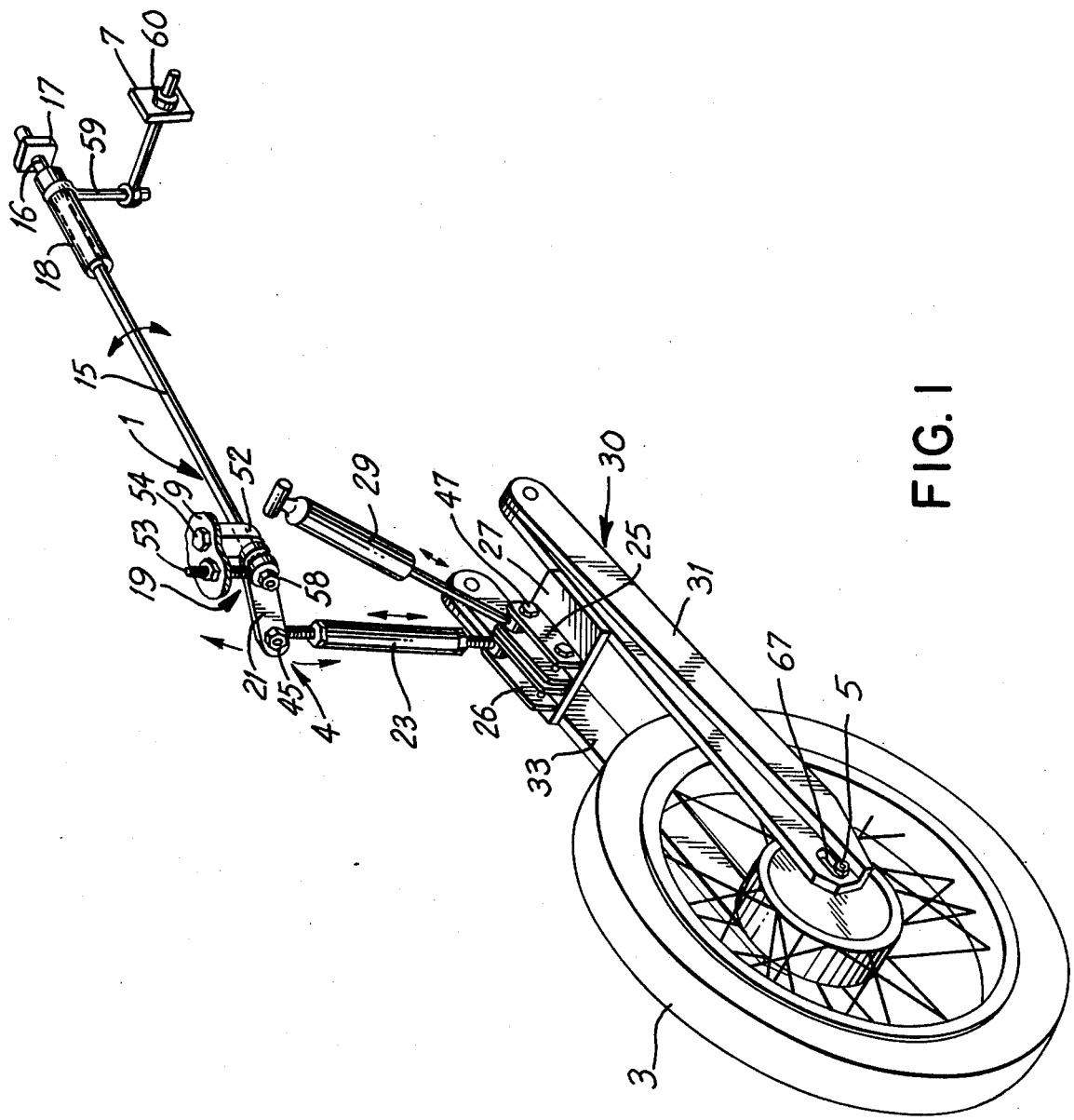
FIG. 1 is a perspective view of the preferred embodiment of the improved motorcycle suspension system 1 of this invention with rear wheel 3 mounted therein.
Figure 2:
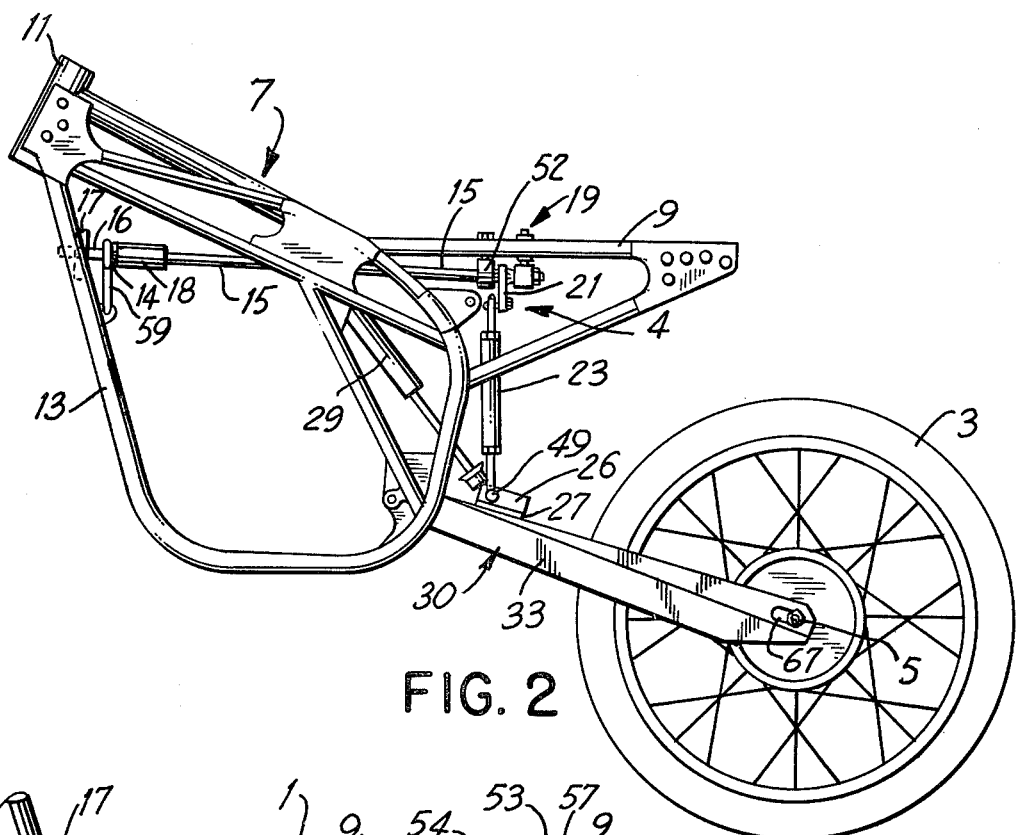
FIG. 2 is a side plan view of the novel suspension system 1 of FIG. 1 attached to motorcycle frame 7.

In reference to FIGS. 1-4, the preferred embodiment of the improved motorcycle suspension system 1 of this invention comprises a preferably cylindrical torsion bar 15 having a first (front) end a second (rear) end mounted substantially horizontally in a motorcycle frame 7; a flat bar arm 21 substantially shorter than torsion bar 15 one end of which is rigidly and perpendicularly attached to torsion bar 15 adjacent to the second end of torsion bar 15; an adjustable strut 23 bolted rotatably at its upper end to the end of bar arm 21 not attached adjacent to torsion bar 15 and at its lower end to a strut bracket 26. Strut bracket 26 is rigidly mounted off-center on a nearly rectangular bracket support plate 27 which is attached to the upper surface of a rear wheel axle support 30 comprising a left swing arm 33 and right arm 31. The length of adjustable strut 23 and bar arm 21 and the distance the center of strut bracket 26 is from the center of support plate 37 are chosen so that at rest strut bracket 23 is substantially vertical, bar arm 21 is directed away from torsion rod 15 so as to point somewhat downwardly, and adjustable strut 23 and bar arm 21 cooperate together to form a multiplying linkage 4 which requires a progressively larger upward force to cause progressively larger upward displacements.

Motorcycle frame 7 which supports the wheels 3, motor, seat and tank comprises a tubular portion shaped somewhat like a parallelogram having a short tubular steering column support 11 attached to its front end and a substantially flat horizontal rear frame support plate 9 attached to its rear end.

The front of rear wheel axle support 30 is attached pivotally and rotatably to the frame 7 and the rear of the axle support 30 holds the rear axle 5. Left swing arm 33 and right swing arm 31 of axle support 30 are two substantially rectangular-cross-sectioned, equal metal bars attached at their front ends to frame 7 by passing a bolt rotatably through opposed pivot holes 63 in their front ends. Left swing arm 33 is attached to right swing arm 31 by a vertically disposed rectangular swing arm support plate 61 positioned nearer the front than rear ends of the swing arms 31 and 33. Rear wheel axle 5 passes through and is held in opposing axle holes 67 in the rear of swing arms 31 and 33.

The first end of torsion bar 15 is splined and is held by a washer 14 attached to one side of an L-shaped tension winder 59. The inner diameter of washer 14 is splined and so conformed to engage the first end of torsion bar 15 for greater strength. A coupling pipe 18 shown in FIG. 3 of the same radius as washer 14 is attached perpendicularly to washer 14 and tension winder 59. Coupling pipe 18 is attached to washer 14 at one end, but its edges at its other end are inwardly-turned. The inwardly-turned edges of coupling pipe 18 support torsion bar 15 which passes there through to engage splined washer 14 attached to tension winder 59. A coupling shaft 16 of a similar radius as that of torsion bar 15 is attached to the end of L-shaped tension winder 59 attached to washer 14 on the side opposite to where washer 14 is attached. Coupling shaft 16 is a continuation of torsion bar 15 and passes through and is held by first bar support 17 which is a substantially flat piece of metal having a hole therein; support 17 being rigidly attached to frame 7 on frame tube 13.

One end of tension winder 59 is attached to splined washer 14 while the other end is a threaded rod which passes through a hole in the surface of frame 7 to engage a wing nut 60. Tension winder 59 acts to hold splined washer 14 and the end of torsion bar 15 fixed so that an opposing torque will be produced at the other end of torsion bar 15 when a torque is applied thereto. Furthermore, tension winder 59 may be jointed so that by adjusting the winder nut 60 the torsion bar 15 may be preloaded or twisted so that it is even more difficult to twist. Thus continuous adjustment of the stiffness and responsiveness of the suspension system 1 to upward and downward displacements is provided by tension winder 59.

Figure 3:
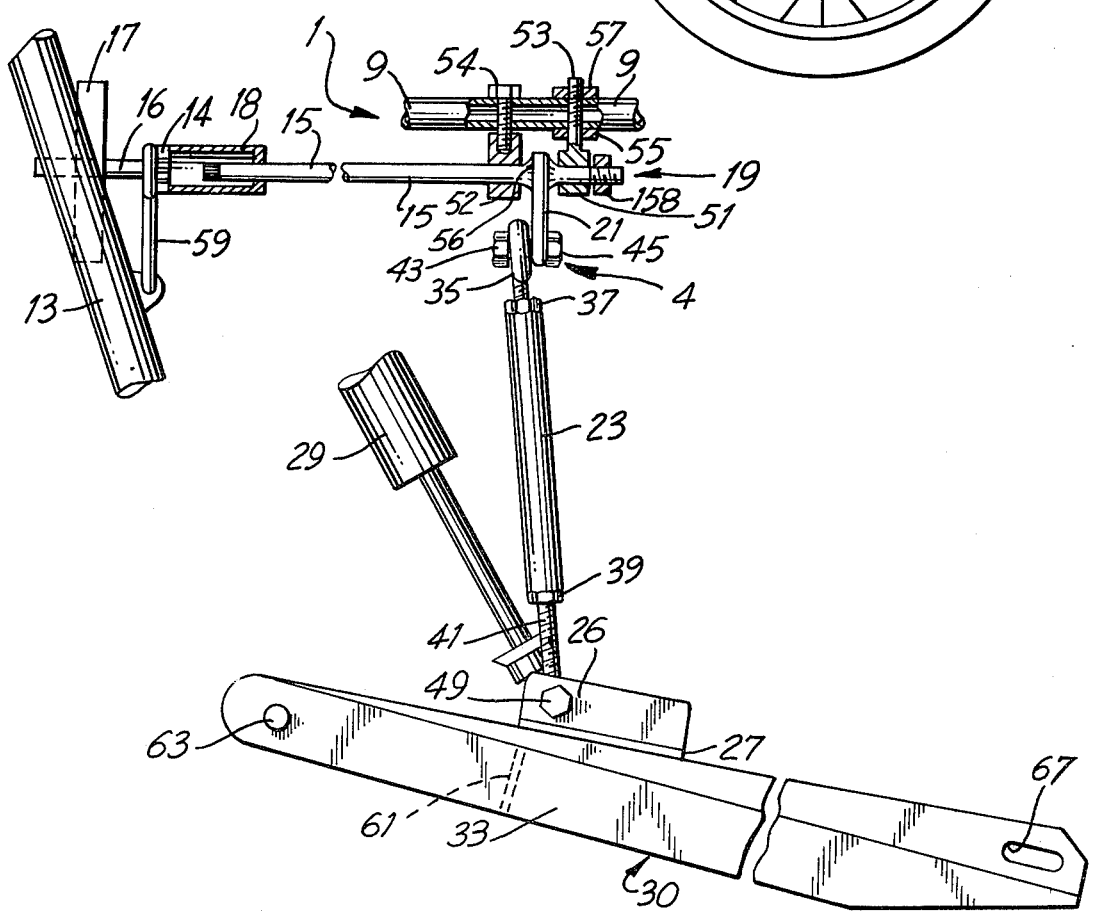
FIG. 3 is a detailed side plan view of the novel suspension system 1 of FIG. 1.

As shown in FIG. 3, the second end of torsion bar 15 is supported rotatably by joint 19 mounted behind bar arm 21. Heim (TM of Heim Co. of Connecticut) joint 19 comprises a ring 51 mounted at the head of a threaded bolt 53. The ring 51 is just large enough for the torsion bar 15 to pass rotatably therethrough and is secured in position by vertical threaded bolt 53 below frame support plate 9 by upper nut 57 and lower nut 55. Furthermore torsion bar 15 passes rotatably through and is partially supported by rectangular support 52 attached in front of bar arm 21 below support plate 9 by threaded bolt 54. To provide additional structural support the torsion bar 15 is swollen and splined at 56 in the vicinity of the bar arm 21 and bar arm 21 is conformed and attached to torsion bar 15 to engage the splines in torsion bar 15. Torsion bar 15 is further held in position by nut 58 which engages threads on the second end of torsion bar 15 and abuts against ring 51 of joint 19.

Adjustable-length strut 23 is a conventional cylindrical adjustable-length strut having nuts 37 and 39 attached at its upper and lower ends. Threaded ring bolts 35 and 41 respectively engage nuts 37 and 39. By screwing in or out ring bolts 35 and 41, the length of the strut 23 can be varied. However, the details of the construction of adjustable strut 23 are old in the art and are not a part of this invention.

The upper end of adjustable strut 23 is bolted rotatably to bar arm 21 by passing partially threaded bolt 43 through a hole in the end of bar arm 21 not attached to torsion bar 15 and engaging nut 45. The lower end of strut 23 is secured to rear axle support 30 by bolting the lower ring bolt 41 of strut 23 by bolt 49 to strut bracket 26.

Figure 4:
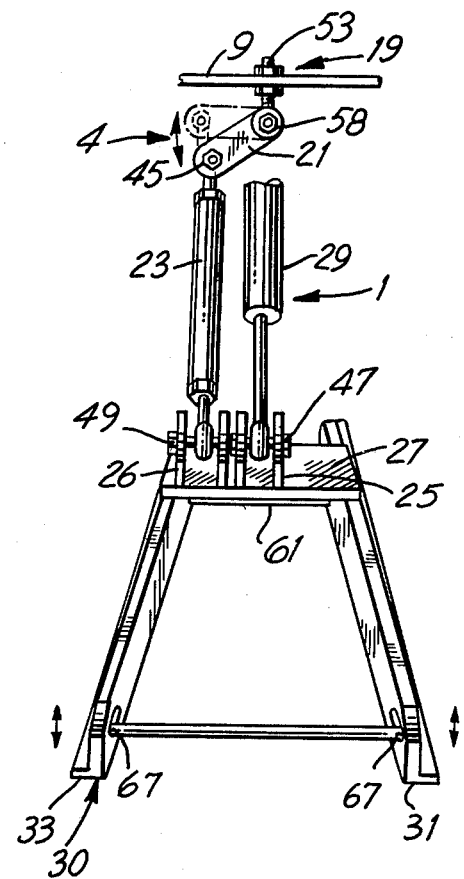
FIG. 4 is a rear perspective view of the novel suspension system 1 of FIG. 1.
Figure 5:
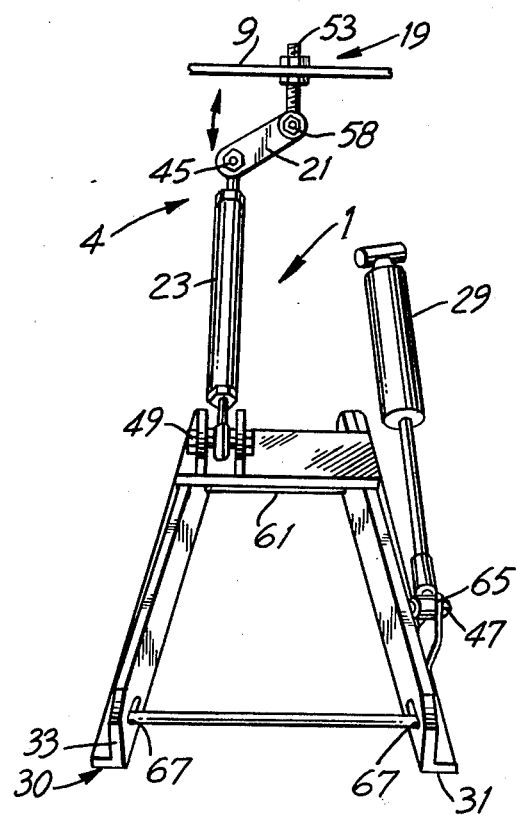
FIG. 5 is a rear perspective view of an alternative embodiment of the improved suspension system 1 of this invention.

A shock absorber 29 is attached between the front end of shock absorber bracket 25 centered on support plate 27 adjacent to strut bracket 26 at the front of support plate 27 as shown for the preferred embodiment of FIG. 4 by bolt 47. Shock absorber 29 acts to decrease rebound and is shown without the exterior spring. An alternate embodiment is shown in FIG. 5 in which the shock absorber 29 is attached on the side of rear axle support 30 opposite bracket 26 to auxiliary bracket 65.

In operation the novel motorcycle suspension system 1 of this invention acts to damp an upward motion of rear axle support 30 by reversibly converting through adjustable strut 23 an upward motion into a rotation of bar arm 21. As bar arm 21 is rotated an opposing torque is created by twisting torsion bar 15. This opposing torque becomes progressively larger as the torsion bar 15 is twisted further. The opposing torque rapidly restores the wheel 3 to its equilibrium position by exerting a downward force on strut 23 after it has left the bump. The stiffness or rapidity of damping is continuously adjustable by twisting winder nut 60 on tension winder 59 which acts to pretwist torsion bar 15.

Further more multiplying linkage 4 comprising adjustable strut 23 and bar arm 21 acts to provide additional damping by requiring a progressively greater force to displace it upwardly for progressively larger displacements. This is due to the decreasing angle between strut 23 and bar arm 21 requiring an increasing force to provide an equivalent torque to torsion bar, after the bar arm 21 has been raised past the horizontal position, i.e., the decreasing angle, after the horizontal position, provides a shortened effective moment arm which is progressively shortened as the angle is decreased 15.

The invention as set forth in the claims as appended below is not to be limited by the methods used to join and attach individual adjacent pieces as described in the above preferred embodiment nor is it to be limited by the dimensions or materials out of which the pieces are composed.

What is claimed is:

1. An improved motorcycle suspension system for a motorcycle having a motorcycle frame for supporting the parts of said motorcycle comprising a single elongated substantially straight torsion bar having a first end and a second end; a rear wheel axle support attached pivotally to said motorcycle frame; means for holding said first end of said torsion bar to said frame to prevent rotation thereof; a multiplying linkage means including a moment arm lever for reversibly converting the substantially vertical motion of said rear wheel axle support caused by irregularities in the surface over which said motorcycle is ridden into a torque applied to said second end of said torsion bar causing said torsion bar to provide a progressively larger opposing torque in reaction to said applied torque by progressively shortening the effective moment of the said arm lever and requiring progressively more force to apply an equivalent torque to said torsion bar for progressively larger upward displacements thus damping the motions of said rear wheel axle support.

2. An improved motorcycle suspension system according to claim 1 additionally comprising a shock absorber having an upper end and a lower end, said upper end of said shock absorber being attached to said frame and said lower end of said shock absorber being attached to said rear wheel axle support, said shock absorber acting to provide additional damping of the motions of said rear wheel axle support.

3. An improved motorcycle suspension system according to claim 1 additionally comprising a tension winder attached to said torsion bar adjacent said first end of said torsion bar, said tension winder providing a means for adjustably twisting said torsion bar controlling thereby said damping of said motions of said rear wheel axle support.

4. An improved motorcycle suspension system according to claim 3, wherein said tension winder is L-shaped, jointed, and attached perpendicularly to said torsion bar, one end of said tension winder being rigidly attached to said torsion bar and the other end of said tension winder being a partially threaded rod which passes through an outer surface of said motorcycle frame to engage a winder nut, said winder nut providing a means for adjustably twisting said torsion bar to provide a variable stiffness to said suspension system.

5. An improved motorcycle suspension system according to claim 4, wherein said first end of said torsion bar is supported by a first bar support attached to said frame, said torsion bar is horizontally oriented and cylindrical, and said second end of said torsion bar is supported by a joint and a second bar support positioned adjacent to said second end of said torsion bar, said joint comprising a ring and a radially directed, threaded bolt attached to the outer peripheral surface of said ring, said ring being oriented and positioned by securing said threaded bolt to said motorcycle frame so that said torsion bar is supported by and passes rotatably therethrough.

6. An improved motorcycle suspension system according to claim 1 wherein said multiplying linkage comprises a bar arm as the moment arm lever, said bar arm having first and second opposite ends and with its first end substantially horizontally at rest position with its first end pivotally attached to said second end of said torsion bar so as to act as a moment arm lever by which a torque can be applied to said second end of said torsion bar; and an adjustable-length strut having an upper end and a lower end, said strut being attached rotatably at said upper end to said second end of said bar arm and pivotally attached at said lower end to said rear wheel axle support.

7. An improved motorcycle suspension system according to claim 6 wherein said rear axle support comprises substantially equal left and right swing arms oriented nearly horizontally so as to have a front end and a rear end, said swing arms being attached to one another and supported by a swing arm support plate oriented perpendicularly to the plane of said motorcycle, said support plate being pivotally attached to said lower end of said strut; said swing arms being substantially closer to each other at said front ends than at said rear ends, being pivotally attached to said frame at said front ends, and supporting said rear wheel axle adjacent said rear ends.

* * * * *